(12) United States Patent
Hiruta

(10) Patent No.: US 8,606,096 B2
(45) Date of Patent: Dec. 10, 2013

(54) LENS BARREL THAT MOVES LENS UNIT USING VIBRATION ACTUATOR AND CAMERA SYSTEM HAVING THE SAME

(75) Inventor: Kaori Hiruta, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 13/517,817

(22) Filed: Jun. 14, 2012

(65) Prior Publication Data

US 2012/0321289 A1    Dec. 20, 2012

(30) Foreign Application Priority Data

Jun. 16, 2011    (JP) ................................. 2011-133997

(51) Int. Cl.
| | |
|---|---|
| G02B 7/04 | (2006.01) |
| G02B 7/02 | (2006.01) |
| G03B 3/00 | (2006.01) |
| G03B 13/00 | (2006.01) |

(52) U.S. Cl.
USPC ............ 396/144; 396/529; 359/823; 359/827

(58) Field of Classification Search
USPC ................... 396/133, 144; 359/819, 824, 827
See application file for complete search history.

(56) References Cited

U.S. PATENT DOCUMENTS

| | | | | |
|---|---|---|---|---|
| 7,454,135 B2* | 11/2008 | Nakata et al. | .................. | 396/133 |
| 2007/0133973 A1* | 6/2007 | Nishikawa | .................... | 396/133 |

FOREIGN PATENT DOCUMENTS

| | | |
|---|---|---|
| JP | 3170999 B | 5/2001 |
| JP | 2008-167561 A | 7/2008 |

* cited by examiner

*Primary Examiner* — Rochelle-Ann J Blackman
(74) *Attorney, Agent, or Firm* — Rossi, Kimms & McDowell LLP

(57) ABSTRACT

A lens barrel includes a lens holding frame that holds a lens unit that is movable in an optical axis direction, a first guide member that guides the lens holding frame in the optical axis direction, a drive shaft that extends in the optical axis direction, a slider that includes a pressure contact portion that slidably contacts the drive shaft in a longitudinal direction and a coupling portion that is coupled to the lens holding frame, a second guide member that guides the slider in the optical axis direction, a vibration element that is provided on one of the drive shaft and the slider, a drive case that holds the drive shaft and the second guide member, and a cover member that is fixed on the drive case to cover the pressure contact portion of the slider and protrude the coupling portion to an outside of the cover member.

6 Claims, 5 Drawing Sheets

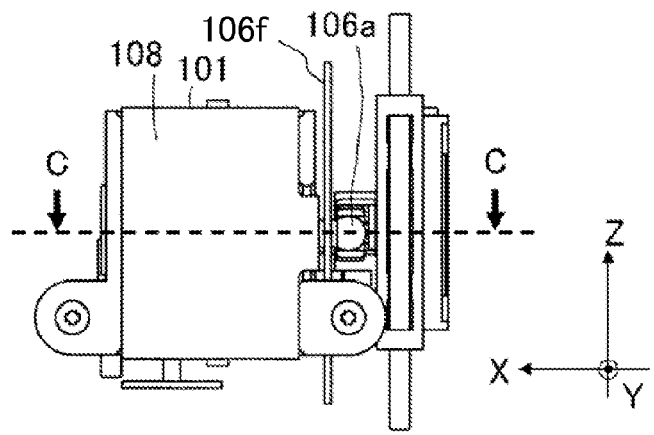
FIG. 10
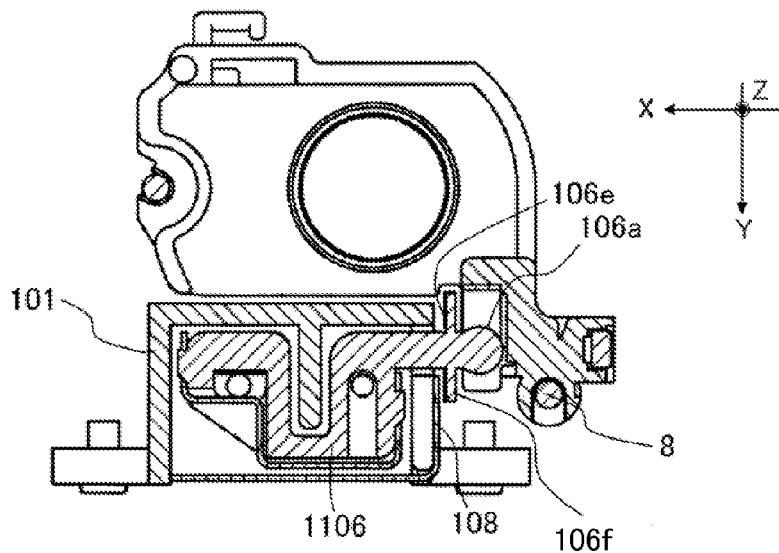
FIG. 11
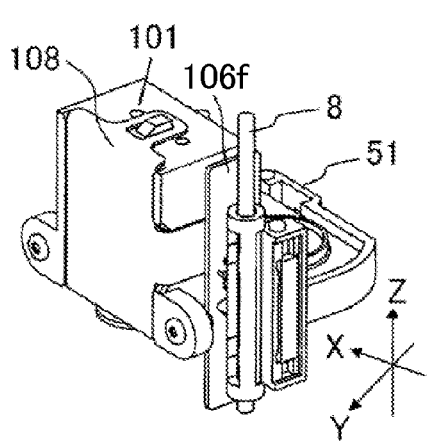 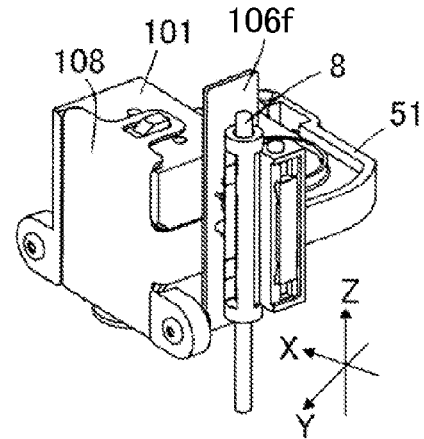
FIG. 12A          FIG. 12B

LENS BARREL THAT MOVES LENS UNIT USING VIBRATION ACTUATOR AND CAMERA SYSTEM HAVING THE SAME

BACKGROUND OF THE INVENTION

1. Field of the Invention

The present invention relates to a lens barrel that moves a lens unit using a vibration actuator.

2. Description of the Related Art

Conventionally, a vibration actuator in which an object to be driven contacts a vibration body configured by a vibration element such as a piezoelectric element to vibrate this vibration body to relatively move a moving lens unit by a friction of a pressure contact portion for the movable lens in a lens barrel has been known. This vibration actuator may generate abrasion powders at the pressure contact portion by the slide of the vibration body and the object to be driven.

Japanese Patent Laid-Open No. 2008-167561 discloses a rotating type vibration actuator. However, when the rotating type vibration actuator as disclosed in Japanese Patent Laid-Open No. 2008-167561 is used, a conversion mechanism such as cam slope that couples for a cam pin of converting a rotating motion into a translatory movement is necessary. Therefore, a whole size of the apparatus is enlarged. Furthermore, if the moving lens unit needs to move at high speed, a rating ring needs to rotate at higher speed and the energy efficiency is reduced, and also a problem that generates a noise or the like may occur due to the high-speed rotation of the rotating ring.

Japanese Patent No. 3170999 discloses a configuration in which a moving lens unit is moved in an optical axis direction using a direct acting type vibration actuator that moves along a drive shaft extending in the optical axis direction. When the direct acting type vibration actuator is used, the growth in size of the whole of the apparatus can be avoided compared to a case where a rotating ring type actuator is used because an object to be driven moves in the moving direction integrally with the moving lens unit. In addition, since a conversion member that is needed for the rotating ring type actuator is not necessary, energy efficiency is good and a silent lens barrel can be provided.

However, the direct acting type vibration actuator changes a position of the pressure contact portion in accordance with a position of the moving lens unit. Therefore, it is difficult to cover a space that contains the pressure contact portion for the purpose of preventing the scatter of the abrasion powders.

In the direct acting type vibration actuator that is disclosed in Japanese Patent No. 3170999, the drive shaft that is a vibration body and the pressure contact portion of the object to be driven are exposed. Therefore, the abrasion powders generated at the pressure contact portion are scattered to a lens or an optical element such as an image sensor, and a harmful influence on an output image may be made.

SUMMARY OF THE INVENTION

The present invention provides a lens barrel that prevents scattering of abrasion powders generated from a pressure contact portion of a direct acting type vibration actuator to an optical element.

A lens barrel as one aspect of the present invention includes a lens holding frame that holds a lens unit that is movable in an optical axis direction, a first guide member configured to guide the lens holding frame in the optical axis direction, a drive shaft that extends in the optical axis direction, a slider that includes a pressure contact portion that slidably contacts the drive shaft in a longitudinal direction and a coupling portion that is coupled to the lens holding frame, a second guide member configured to guide the slider in the optical axis direction, a vibration element that is provided on one of the drive shaft and the slider, a drive case that holds the drive shaft and the second guide member, and a cover member that is fixed on the drive case to cover the pressure contact portion of the slider and protrude the coupling portion to an outside of the cover member.

A camera system as another aspect of the present invention includes the lens barrel and a camera body configured to detachably mount the lens barrel.

Further features and aspects of the present invention will become apparent from the following description of exemplary embodiments with reference to the attached drawings.

BRIEF DESCRIPTION OF THE DRAWINGS

FIG. 10 is a cross-sectional view of the peripheral structure of the fourth lens unit when viewed in a Y-axis direction in Embodiment 2.

FIG. 11 is a cross-sectional view of illustrating a cross section of C-C in FIG. 10 in Embodiment 2.

FIGS. 12A and 12B are perspective views of the fourth lens unit in a state where an object to be driven is positioned at a mechanical end in a +Z direction and in a state where the object to be driven is positioned at a mechanical end in a –Z direction, respectively, in Embodiment 2.

DESCRIPTION OF THE PREFERRED EMBODIMENTS

Figure 1:
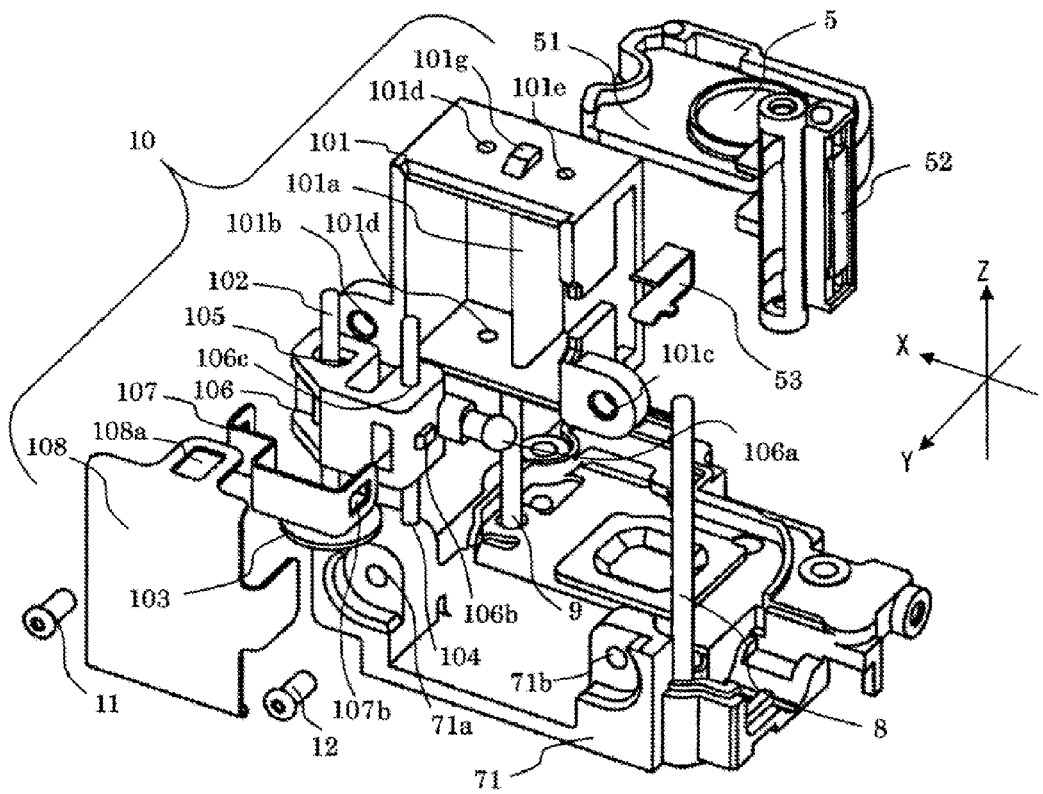
FIG. 1 is an exploded perspective view of illustrating a fourth lens unit, a drive unit that moves the fourth lens unit (a direct acting type vibration actuator), and their peripheral structure in Embodiment 1.

Exemplary embodiments of the present invention will be described below with reference to the accompanied drawings. In each of the drawings, the same elements will be denoted by the same reference numerals and the duplicate descriptions thereof will be omitted.

[Embodiment 1]

First of all, referring to FIGS. 1 to 8, a lens barrel in Embodiment 1 of the present invention will be described. In these drawings, an optical axis direction is defined as a Z-axis, an arbitrary direction of directions orthogonal to the optical axis direction is defined as an X-axis, and a direction perpendicular to the X-axis of the directions orthogonal to the optical axis direction is defined as a Y-axis.

Figure 2:
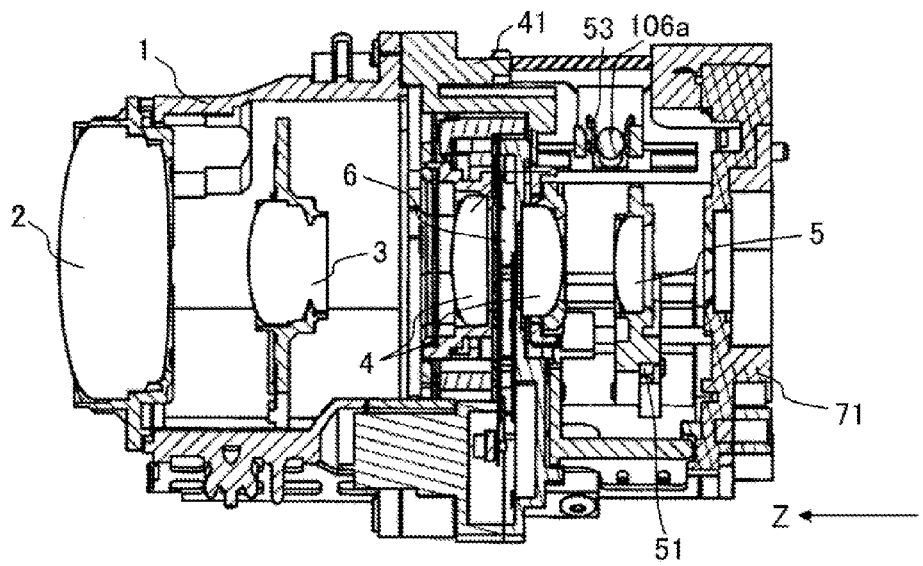
FIG. 2 is a cross-sectional view of a lens barrel in Embodiment 1.
Figure 3:
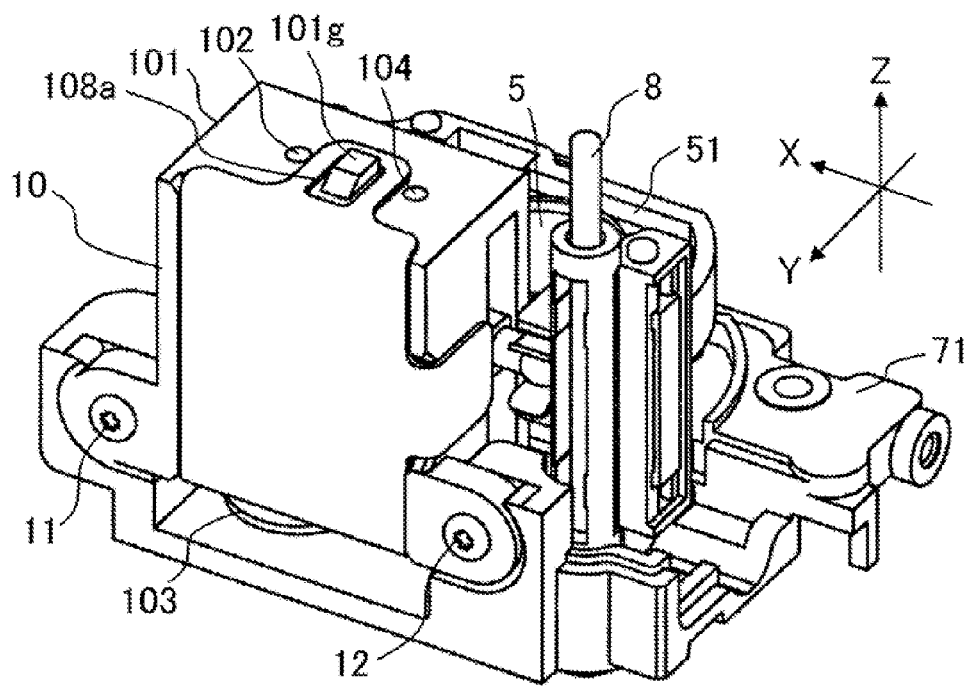
FIG. 3 is a perspective view of illustrating the fourth lens unit, the drive unit that moves the fourth lens unit (the direct acting type vibration actuator), and their peripheral structure in Embodiment 1.
Figure 4:
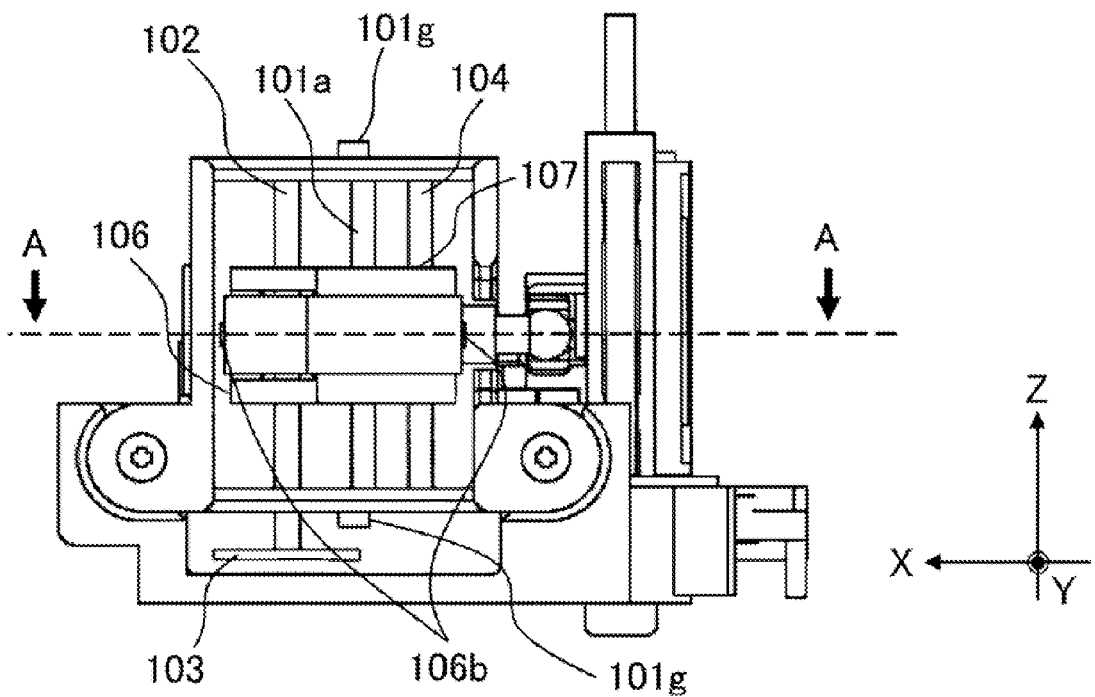
FIG. 4 is a cross-sectional view of the peripheral structure of the fourth lens unit when viewed in a Y-axis direction in Embodiment 1.
Figure 5:
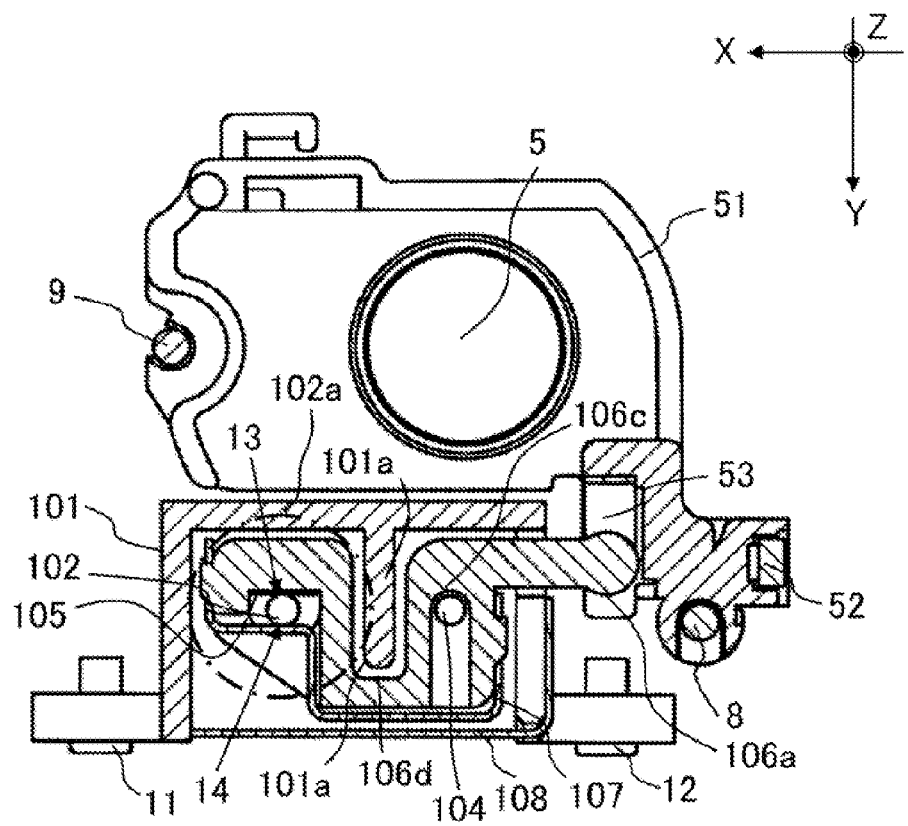
FIG. 5 is a cross-sectional view of illustrating a cross section of A-A in FIG. 4 in Embodiment 1.
Figure 6:
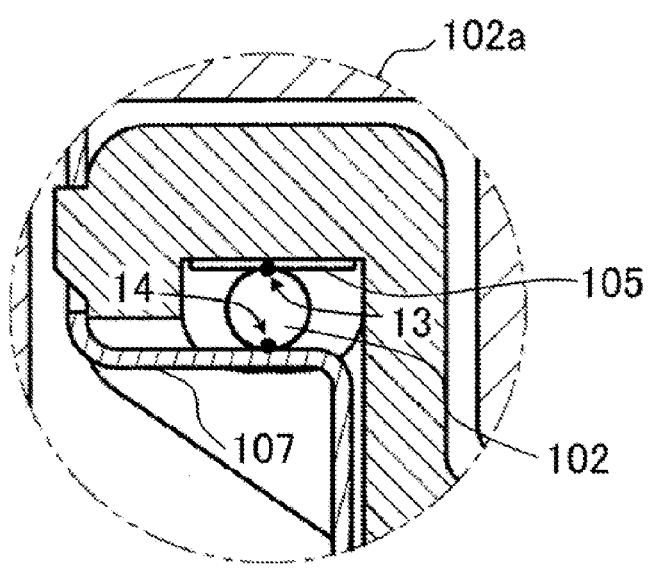
FIG. 6 is an enlarged view of a region 102a in FIG. 5 in Embodiment 1.
Figure 7:
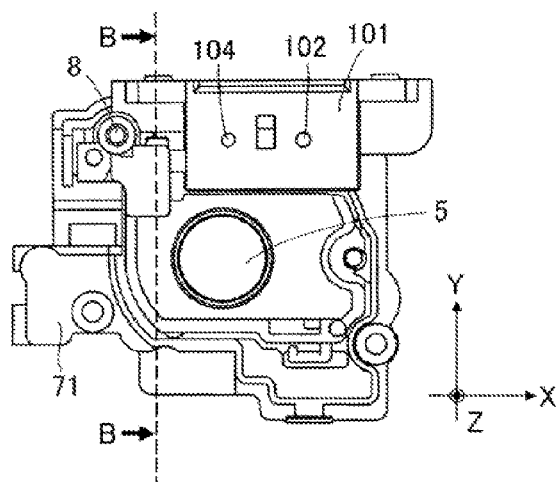
FIG. 7 is a cross-sectional view of the peripheral structure of the fourth lens unit when viewed in a Z-axis direction in Embodiment 1.
Figure 8:
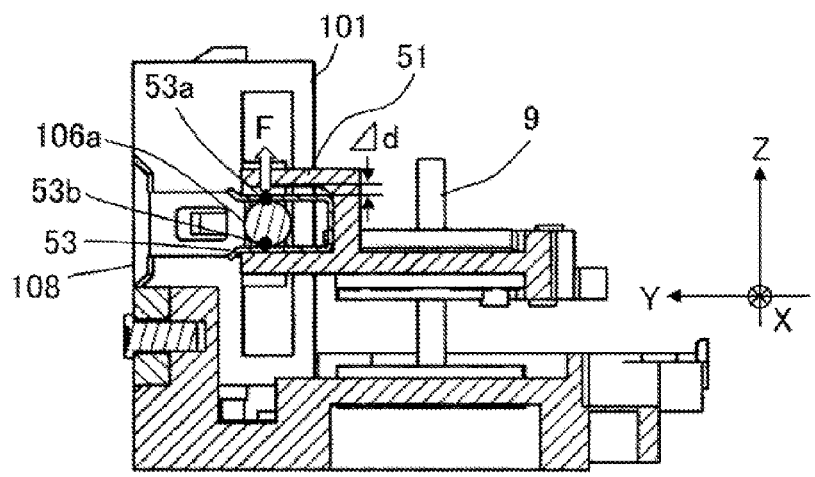
FIG. 8 is a cross-sectional view of illustrating a cross section of B-B in FIG. 7 in Embodiment 1.

FIG. 1 is an exploded view of illustrating a fourth lens unit 5 that is a moving lens, a drive unit 10 (a direct acting type vibration actuator) that moves the fourth lens unit 5, and their peripheral structure in the present embodiment. FIG. 2 is a cross-sectional view of a lens barrel 1 in the present embodiment. FIG. 3 is a perspective view of illustrating the fourth lens unit 5, the drive unit 10 that moves the fourth lens unit 5, and their peripheral structure. FIG. 4 is a cross-sectional view of the peripheral structure of the fourth lens unit when viewed in the Y-axis direction. FIG. 5 is a cross-sectional view of illustrating a cross section A-A in FIG. 4. FIG. 6 is an enlarged view of a region 102a in FIG. 5. FIG. 7 is a cross-sectional view of the peripheral structure of the fourth lens unit 5 when viewed in the Z-axis direction. FIG. 8 is a cross-sectional view of illustrating a cross section B-B in FIG. 7.

The lens barrel 1 has a four-unit configuration of a first lens unit 2, a second lens unit 3, a third lens unit 4, and the fourth lens unit 5. The lens barrel 1 includes a light amount adjusting aperture mechanism 6 between lenses constituting the third lens unit 4, and also includes an image pickup element (not shown) at a rear side of the fourth lens unit 5 (at an image side). Among these lens units, the second lens unit 3 is a magnification varying optical system, which is configured so as to be movable in the optical axis direction (the Z-axis direction). The third lens unit 4 is an image stabilizing optical system, which is configured so as to be movable in the direction orthogonal to the optical axis (in an XY plane). The fourth lens unit 5 is a focusing optical system, which is configured so as to be movable in the optical axis direction (the Z-axis direction). Hereinafter, a case where the present embodiment is applied to the fourth lens unit 5 that is the focusing optical system among these optical systems will be described as an example. However, the present embodiment is not limited to this, and can also be applied to the second lens unit 3 that is the magnification varying optical system or the like for example.

A fourth lens holding frame 51 (a lens holding frame) holds the fourth lens unit 5 and is held so as to be movable in the optical axis direction (the Z-axis direction) by a main guide shaft 8 (a first guide member) and a sub guide shaft 9. The main guide shaft 8 guides the fourth lens holding frame 51 in the optical axis direction. The main guide shaft 8 and the sub guide shaft 9 are fixed by an image pickup element holding frame 71 (a fixed member) and a member 41 by which the third lens unit 4 is fixed. The fourth lens holding frame 51 includes a U-shaped leaf spring 53 for receiving a coupling portion at a region where outputs from a sensor 52 for detecting a position and the drive unit 10 are transferred, and determines an output of the actuator based on a target position and the output of the sensor 52 so that a position control is performed.

As illustrated in FIG. 1, the drive unit 10 is configured by each component of a drive case 101, a drive shaft 102, a piezoelectric element 103 (a vibration element), a guide shaft 104, a drive shaft bearing plate 105, an object to be driven 106 (a slider), a preload leaf spring 107, and a cover member 108. The drive case 101 adheres to a coupling member configured by coupling the piezoelectric element 103 to the drive shaft 102 extending in the optical axis direction using silicone adhesives or the like at a drive shaft holding portion 101d to hold it. The drive case 101 also holds the guide shaft 104 (a first guide member) that guides the object to be driven 106 in a moving direction (the optical axis direction) at a guide shaft holding portion 101e. The drive case 101 is provided with partition wall 101a of a space in the drive case 101 between the drive shaft holding portion 101d and the guide shaft holding portion 101e. The drive case 101 fastens fastening portions 101b and 101c to fastening portions 71a and 71b of the image pickup element holding frame 71 (the fixed member) using screws 11 and 12 to be attached, respectively.

The object to be driven 106 has the drive shaft bearing plate 105. The preload leaf spring 107 biases the drive shaft 102 with a predetermined force so that the drive shaft bearing plate 105 and the preload leaf spring 107 vertically hold the drive shaft 102 between them to be fixed to the object to be driven 106. In the present embodiment, a hole portion 107b of the preload leaf spring 107 is hooked on a click portion 106b of the object to be driven 106, and therefore the preload leaf spring 107 is fixed on the object to be driven 106. The object to be driven 106 is slidably held in the optical axis direction (the Z-axis direction) with respect to the guide shaft 104 at a holding portion 106c. Thus, as illustrated in FIGS. 5 and 6, a pressure contact force is generated on each of a pressure contact portion 13 of the drive shaft 102 and the drive shaft bearing plate 105, and a pressure contact portion 14 of the drive shaft 102 and the preload leaf spring 107. When the drive shaft 102 that is coupled to the piezoelectric element 103 is vibrated, the pressed object to be driven 106 moves along the guide shaft 104.

The pressure contact portions 13 and 14 of the object to be driven 106 press to contact slidably in a longitudinal direction of the drive shaft 102. As illustrated in FIG. 6, the pressure contact portions 13 and 14 of the present embodiment press to contact the drive shaft 102 on two planes. However, the embodiment is not limited to this and may also be configured so that the pressure contact portions 13 and 14 press to contact on two or more areas by combining a V-groove and a plane or the like. When the pressure contact portions 13 and 14 press to contact on two or more areas, it is necessary to perform a parallel adjustment between the guide shaft 104 and the drive shaft 102.

The object to be driven 106, as illustrated in FIG. 5, has a concave portion 106d that goes around the partition wall 101a (a wall portion) between the pressure contact portions 13 and 14 (the drive shaft 102) and the guide shaft holding portion 106c (the guide shaft 104). In other words, the partition wall 101a of the drive case 101 is disposed so as to be inserted into the concave portion 106d of the object to be driven 106. Furthermore, the object to be driven 106 has a coupling portion 106a that is coupled to the fourth lens holding frame 51 at a side of the guide shaft 104 (at a second guide member side) with respect to the partition wall 101a. The coupling portion 106a has a spherical shape or a shape in which a region of contacting the leaf spring 53 for receiving the coupling portion has a spherical surface.

The coupling portion 106a is assembled with respect to the leaf spring 53 for receiving the coupling portion that is provided on the fourth lens holding frame as illustrated in FIG. 8. The leaf spring 53 for receiving the coupling portion holds the spherical coupling portion 106a at two points of holding portions 53a and 53b in the Z-axis direction. The holding portion 53a of the leaf spring 53 for receiving the coupling portion holds the coupling portion 106a with an elastic force F in the Z-axis direction in a state where a clearance of a distance Δd is provided between the fourth lens holding frame 51 and the leaf spring 53 for receiving the coupling portion. Owing to the elastic force F, the fourth lens holding frame 51 is always biased in the Z-axis direction with respect to the drive unit 10. A coupling mechanism of the coupling portion 106a and the leaf spring 53 for receiving the coupling portion can permit errors of a position on the YX plane and a rotation around the X-axis, Y-axis, and Z-axis of the coupling portion 106a.

As described above, the drive unit 10 is a direct acting type vibration actuator in which the object to be driven 106 that is pressed to be contacted by the vibration of the drive shaft 102 coupled with the piezoelectric element 103 moves along the guide shaft 104 in the optical axis direction. The object to be driven 106 moves along the guide shaft 104 by the vibration of the piezoelectric element 103. The fourth lens holding frame 51 is configured to be movable along the main guide shaft 8 when the coupling portion 106a that is protruded from the drive unit 10 transfers a drive force to the fourth lens holding frame 51 via the leaf spring 53 for receiving the coupling portion.

In this case, at the pressure contact portions 13 and 14, the abrasion powders or cutting scraps may be generated from the drive shaft 102, the drive shaft bearing plate 105, and the preload leaf spring 107 because of the slide between the drive shaft 102 and the drive shaft bearing plate 105, and the slide between the drive shaft 102 and the preload leaf spring 107. Therefore, the drive case 101 is provided with the partition wall 101a between the pressure contact portions 13 and 14 and the guide shaft holding portion 106c and is also provided with the cover member 108 that covers the drive case 101. When the hole portion 108a of the cover member 108 is hooked on the click portion 101g of the drive case 101, the cover member 108 is fixed on the drive case 101. Thus, the cover member 108 is fixed on the drive case 101 to cover the pressure contact portions 13 and 14 of the object to be driven 106 and also to protrude the coupling portion 106a to the outside.

Thus, since the partition wall 101a is provided, a harmful influence of the drive that is caused by the scatter of the abrasion powders to the guide shaft 104 can be avoided. The object to be driven 106 includes the coupling portion 106a at the side of the partition wall 101a to separate the pressure contact portions 13 and 14 from the coupling portion 106a and also to cover the drive case 101 using the cover member 108. According to such configurations, the scatter of the abrasion powders to the outside of the drive case 101 and the adhesion of the abrasion powders to the optical element can be suppressed. Furthermore, when adhesive is applied to the inside of the drive case 101, the scatter of the abrasion powders or the like to the outside of the drive case 101 can be effectively suppressed.

[Embodiment 2]

Next, referring to FIGS. 9 to 12A and 12B, a lens barrel in Embodiment 2 of the present invention will be described. The lens barrel of the present embodiment includes an object to be driven 1106 as a modification of the object to be driven 106 in Embodiment 1. Since the configuration other than the object to be driven 1106 is the same as that of the lens barrel of Embodiment 1, descriptions common to those of Embodiment 1 are omitted.

Figure 9:
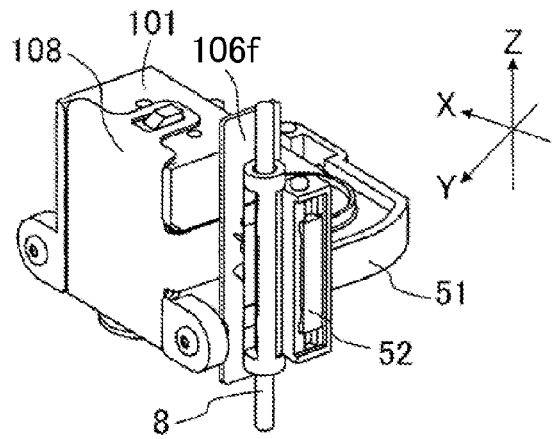
FIG. 9 is a perspective view of a fourth lens unit in Embodiment 2.

FIG. 9 is a perspective view of a fourth lens unit in the present embodiment. FIG. 10 is a cross-sectional view of a peripheral structure of the fourth lens unit when viewed in a Y-axis direction. FIG. 11 is a cross-sectional view of illustrating a cross section C-C in FIG. 10. FIGS. 12A and 12B are perspective views of the fourth lens unit, and FIGS. 12A and 12B illustrate cases in which the object to be driven is positioned at a mechanical end in a +Z direction and in a −Z direction, respectively.

As illustrated in FIGS. 9 to 12A and 12B, the object to be driven 1106 is provided with a plate-shaped shielding portion 106f between the drive case 101 and the coupling portion 106a. The shielding portion 106f extends in the optical axis direction (the Z-axis direction), and as illustrated in FIGS. 12A and 12B, it prevents exposure of the inside of the drive case 101 in a whole range of a drive stroke. As a result, if the abrasion powders or the like are scattered to the outside of the drive case 101, the shielding portion 106f can prevent the abrasion powders or the like from transferring via the coupling portion 106a to be further scattered and can also prevent them from adhering to the optical element in the lens barrel. In addition, when adhesive is applied to a surface 106e of the shielding portion 106f at the side of the drive case 101, the scatter of the abrasion powders can be prevented more effectively.

According to each embodiment described above, a lens barrel that suppresses the scatter of abrasion powders generated from a pressure contact portion of a direct acting type vibration actuator to an optical element can be provided. Therefore, a small and silent lens barrel can be provided.

The vibration actuator of each embodiment described above is unitized in a state where the coupling portion is protruded. This unitization enables the actuator to perform an operation test by itself and omits the complexity of repeating assembly and disassembly of the lens barrel, in addition to make it easy to exchange or repair parts caused by a failure of the actuator or the like. In each of the embodiments described above, the piezoelectric element (the vibration element) is provided on the drive shaft, but each of the embodiments is not limited to this, and the vibration element may also be provided on the object to be driven (a slider). In other words, the piezoelectric element can be provided on one of the drive shaft or the object to be driven. The lens barrel of each embodiment described above is detachably mounted on a camera body (an image pickup apparatus body), which can constitute a camera system.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-133997, filed on Jun. 16, 2011, which is hereby incorporated by reference herein in its entirety.

What is claimed is:

1. A lens barrel comprising:
    a lens holding frame that holds a lens unit that is movable in an optical axis direction;
    a first guide member configured to guide the lens holding frame in the optical axis direction;
    a drive shaft that extends in the optical axis direction;
    a slider that includes a pressure contact portion that slidably contacts the drive shaft in a longitudinal direction and a coupling portion that is coupled to the lens holding frame;
    a second guide member configured to guide the slider in the optical axis direction;
    a vibration element that is provided on one of the drive shaft or the slider, and configured to move the slider along the second guide member by vibrations of the vibration element;
    a drive case that holds the drive shaft and the second guide member; and
    a cover member that is fixed on the drive case to cover the pressure contact portion of the slider and protrude the coupling portion to an outside of the cover member.

2. A lens barrel comprising:
a lens holding frame that holds a lens unit that is movable in an optical axis direction;
a first guide member configured to guide the lens holding frame in the optical axis direction;
a drive shaft that extends in the optical axis direction;
a slider that includes a pressure contact portion that slidably contacts the drive shaft in a longitudinal direction and a coupling portion that is coupled to the lens holding frame;
a second guide member configured to guide the slider in the optical axis direction;
a vibration element that is provided on one of the drive shaft or the slider;
a drive case that holds the drive shaft and the second guide member; and
a cover member that is fixed on the drive case to cover the pressure contact portion of the slider and protrude the coupling portion to an outside of the cover member,
wherein the slider includes a concave portion between the drive shaft and the second guide member,
wherein the drive case includes a wall portion that is inserted into the concave portion, and
wherein the coupling portion is disposed at a side of the second guide member with respect to the wall portion.

3. The lens barrel according to claim 1, wherein the drive shaft, the slider, the vibration element, and the drive case constitute a vibration actuator that is configured so that the slider moves along the drive shaft in the optical axis direction by vibrations of the vibration element.

4. A camera system comprising:
a lens barrel; and
a camera body configured to detachably mount the lens barrel,
wherein the lens barrel includes:
a lens holding frame that holds a lens unit that is movable in an optical axis direction;
a first guide member configured to guide the lens holding frame in the optical axis direction;
a drive shaft that extends in the optical axis direction;
a slider that includes a pressure contact portion that slidably contacts the drive shaft in a longitudinal direction and a coupling portion that is coupled to the lens holding frame;
a second guide member configured to guide the slider in the optical axis direction;
a vibration element that is provided on one of the drive shaft or the slider, and configured to move the slider along the second guide member by vibrations of the vibration element;
a drive case that holds the drive shaft and the second guide member; and
a cover member that is fixed on the drive case to cover the pressure contact portion of the slider and protrude the coupling portion to an outside of the cover member.

5. A lens barrel comprising:
a lens holding frame that holds a lens unit that is movable in an optical axis direction;
a first guide member configured to guide the lens holding frame in the optical axis direction;
a drive shaft that extends in the optical axis direction;
a slider that includes a pressure contact portion that slidably contacts the drive shaft in a longitudinal direction and a coupling portion that is coupled to the lens holding frame;
a second guide member configured to guide the slider in the optical axis direction;
a vibration element that is provided on one of the drive shaft or the slider;
a drive case that holds the drive shaft and the second guide member; and
a cover member that is fixed on the drive case to cover the pressure contact portion of the slider and protrude the coupling portion to an outside of the cover member,
wherein the slider includes a concave portion between the drive shaft and the coupling portion,
wherein the drive case includes a wall portion that is inserted into the concave portion, and
wherein the wall portion is disposed at a side of the coupling portion with respect to the drive shaft.

6. A lens barrel comprising:
a lens holding frame that holds a lens unit that is movable in an optical axis direction;
a first guide member configured to guide the lens holding frame in the optical axis direction;
a drive shaft that extends in the optical axis direction;
a slider that includes a pressure contact portion that slidably contacts the drive shaft in a longitudinal direction, and that is coupled to the lens holding frame;
a second guide member configured to guide the slider in the optical axis direction;
a vibration element that is provided on one of the drive shaft or the slider;
a drive case that holds the drive shaft and the second guide member; and
a cover member that is fixed on the drive case to cover the pressure contact portion of the slider and protrude the slider to an outside of the cover member,
wherein the slider includes a concave portion between the drive shaft and the second guide member,
wherein the drive case includes a wall portion that is inserted into the concave portion, and
wherein the wall portion is disposed at a side of the second guide member with respect to the drive shaft.

* * * * *